(12) United States Patent
Castellon

(10) Patent No.: US 6,343,523 B1
(45) Date of Patent: Feb. 5, 2002

(54) LONGITUDINAL GUIDANCE CONTROL SYSTEM FOR TELESCOPIC SHAFTS AND/OR ASSEMBLIES WITH COLLAPSING MECHANISMS IN MOTOR VEHICLE STEERING COLUMNS

(76) Inventor: Melchor Daumal Castellon, Diputacion, 455, 08013 Barcelona (ES)

( * ) Notice: Subject to any disclaimer, the term of this patent is extended or adjusted under 35 U.S.C. 154(b) by 0 days.

(21) Appl. No.: 09/514,067

(22) Filed: Feb. 25, 2000

(30) Foreign Application Priority Data

Feb. 26, 1999 (ES) .............................. 9900396

(51) Int. Cl.⁷ ................................. B62D 1/18
(52) U.S. Cl. .......................... 74/493; 280/777
(58) Field of Search ................... 74/492, 493; 280/775, 280/777

(56) References Cited

U.S. PATENT DOCUMENTS 5,090,730 A * 2/1992 Du Rocher et al. .......... 280/775
5,338,064 A * 8/1994 Sadakata et al. ............ 280/775
5,377,555 A * 1/1995 Hancock ...................... 74/493
5,857,703 A * 1/1999 Kinoshita et al. ........... 280/775

FOREIGN PATENT DOCUMENTS

JP    5-262239    * 10/1993
JP    6-219284    *  8/1994

* cited by examiner

*Primary Examiner*—David Fenstermacher
(74) *Attorney, Agent, or Firm*—Ostrolenk, Faber, Gerb & Soffen, LLP

(57) ABSTRACT

The longitudinal guidance control system for telescopic shafts or assemblies with collapsing mechanisms in motor vehicle steering columns includes a male member inserted inside a female member and permitting both adaptation of the working length of the steering system and collapse thereof. It has a column support with a substantially U-shaped cross section member, the arms of which are bent to form a concave surface which is extended by extension portions, allowing connection of the support to the vehicle. The system is articulated by means of lugs located at the end of the support which articulate the male member by a pivoting barring, the lower end of which has a hole and a pin allowing movement that the male member relative to the support.

3 Claims, 3 Drawing Sheets

LONGITUDINAL GUIDANCE CONTROL SYSTEM FOR TELESCOPIC SHAFTS AND/OR ASSEMBLIES WITH COLLAPSING MECHANISMS IN MOTOR VEHICLE STEERING COLUMNS

BACKGROUND OF THE INVENTION

The present application for a Patent of Invention relates, as indicated in its title, to a "LONGITUDINAL GUIDANCE CONTROL SYSTEM FOR TELESCOPIC SHAFTS AND/OR ASSEMBLIES WITH COLLAPSING MECHANISMS IN MOTOR VEHICLE STEERING COLUMNS" whose new characteristics of construction, form and design fulfil with maximum reliability and efficacy the purpose for which it has specifically been designed.

More specifically, the invention relates to a purely mechanical arrangement applicable to steering column mechanisms and which allows a range of functions, such as guidance of the column, both in the veritable and longitudinal directions, adjustment thereof so that the same type of column may be adapted to various types of vehicle by reducing or increasing the working length thereof, as well as the collapsing system provided in the majority of steering columns installed in vehicles in which, in the event of an accident and after travelling along a safety length, the steering shaft or male member collapses on another shaft, also known as a female member, which, in combination with said steering shaft, comprises the means necessary for absorbing the impact energy resulting from the pressure applied by the user, who transmits to the steering wheel with his/her hands the force generated by the impact, the steering wheel then transmitting it to said steering column or male member.

A plurality of steering systems exist on the market, and may therefore be regarded as prior art, which are basically arranged between the steering box and the steering wheel situated at the opposite end.

Between the two, steering wheel and box, there is located the steering mechanism proper formed of a male member or steering column which extends into a female member.

The lateral surface of the male member comprises the means necessary for fitting together with other means arranged on the internal lateral surface of the female member, in such a way that, in a first instance, they may be coupled together in a fixed manner, so that the surface or turning force exerted on the steering wheel may be transmitted from the male member to the female member without any type of displacement between them.

Likewise, said lateral surfaces of the male member and female member comprise other means which allow longitudinal guidance of the male member with respect to the female member, for the purpose of relating the length of the steering system to the dimensional characteristics of the vehicle, in such a way that said system may be shortened or lengthened without the need for providing different types of steering mechanism.

Likewise, said steering mechanisms incorporate collapsing systems which allow absorption of the energy applied to the steering wheel in the event of impact, in such a way that the male member may enter the female member, absorbing the impact energy, without the steering column shaft being driven into the front of the user.

All of the above should be combined with other means which simultaneously allow longitudinal displacement of the steering, in the event of the vehicle being equipped with this type of means or indeed, as stated above, with other means which permit adjustment of the length of the steering system to the greater or lesser size of the user, irrespective of the means, already mentioned, for customised positioning of the steering system in accordance not with the characteristics of the user but with those of the vehicle itself.

The object of the present invention is to provide a guidance system which is not only perfectly compatible with the relative displacement between the components of the steering column (male and female members), but also permits optimum control of the movement between the two by means of the connection together of all the mobile components with respect to those which remain stationary, resulting in a proposed mechanical arrangement which is effective at the same time as being of great structural simplicity and very simple to assemble and at the same time as being very cheap to manufacture.

In those telescopic mechanisms which constitute part of the prior art and also in those collapsible installations in which two assemblies have to move relative to one another at a defined instant and under a certain load, it is indispensable for a system to be provided which allows guidance of the mobile assembly in relation to the stationary assembly in a continuous and controlled manner.

The system proposed in the present invention ensures the above mentioned guidance, specifically for steering columns present in motor vehicles, but this does not exclude the possibility of its being used for other applications, owing to its simplicity and ease of functioning.

DESCRIPTION OF THE INVENTION

The present invention relates to a guidance system which permits precise directional control during the relative displacement of two units which, although it may optionally admit of other applications, has been specifically designed for incorporation into for motor vehicle steering columns, that is to say in mechanisms used for transmitting rotation from the steering wheel to the steering box of the vehicle.

More specifically, the present invention relates to telescopic systems and/or systems with integral collapsing mechanisms which experience longitudinal displacement of some components relative to others, which remain stationary, under certain load conditions liable to actuate the telescopic adjusting mechanism, when it is wished to vary the height of the steering wheel relative to the driver or when it is sought to ease mounting of the assembly in the vehicle or when, in the face of an impact, the steering system performs its role as a vehicle safety system.

The proposed system comprises a column support which is secured in the strong structure of the motor vehicle bodywork and which has a lug at one of its ends, i.e. the opposite one from the steering wheel, in which there is articulated a pivoting bearing of the steering column proper, said support being held by an intermediate component sliding under certain conditions with respect to said column support and a lower mobile component which is displaceable longitudinally and veritally, actuated directly by an adjusting mechanism, which, via this component, permits the adjustment in height and depth of the steering column.

As is well known, the telescopic and collapsing functions are usually effected by the assembly formed by at least two members tubular in form or having a suitable profile to allow telescoping of one into the other and which remain suitably fixed in a predetermined relative position until such time as said position changes in conjunction with the length of the assembly, when the latter is subject to a predetermined axial force.

Nevertheless, the steering column of the vehicle consists not only of the above-mentioned sliding elements but also of other components, the purpose of which is to effect various other functions with which this important system is entrusted.

In any event, it is essential that all those members of the column, accessories and auxiliary components and those which are to effect displacement relative to the remainder of the components which attach the column to the vehicle and which remain stationary during said movement, do not exhibit any friction of any kind nor present any hindrance to the movement thereof.

Other details and characteristics of the current application for a Patent of Invention will become clear from a reading of the description given below, which refers to the drawings accompanying this specification and in which the details referred to are shown schematically. These details are given by way of example, referring to one possible practical embodiment which is not limited to those details described here; therefore, this description should be regarded as an illustration, not limiting in any way.

BRIEF DESCRIPTION OF THE DRAWINGS

There follows a detailed list of the various elements cited in the present application for a Patent of invention, (10) column support, (10a) lug (10b) hole, (10c) extension portions, (11) pin, (12) pivoting bearing, (13) universal joint, (14) column shaft, (15) nut, (16) stopper, (17) pin, (18) head, (19) slot, (20) intermediate component, (21) outer-column tube, (22) lower mobile component, (23) members.

DESCRIPTION OF THE DRAWINGS

Figure 1:
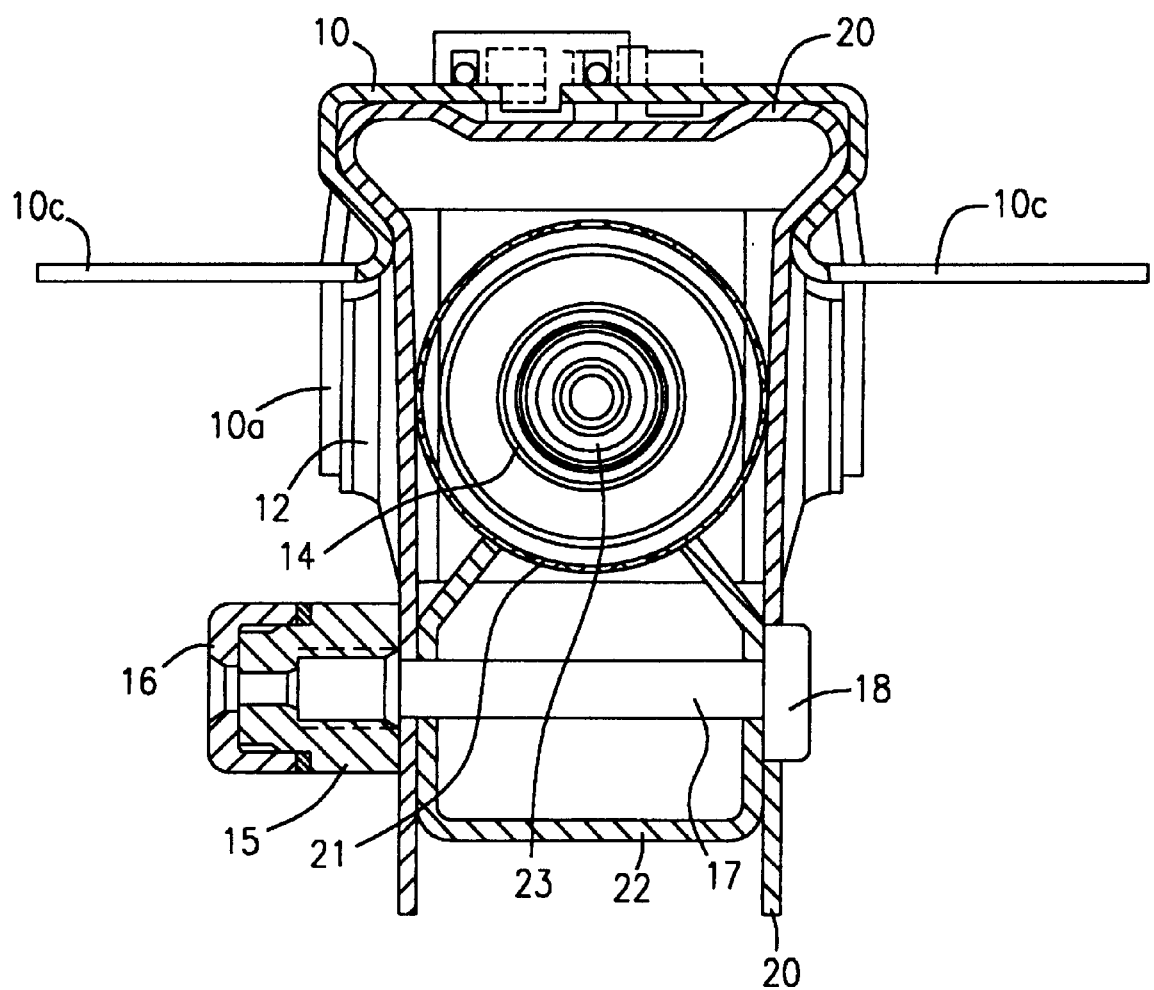
FIG. 1 is a partially sectional front view of a steering column shown by way of example and exhibiting the main components to which the invention described in the present specification relates.

In one of the preferred embodiments of the subject matter of the present application, and as may be seen from FIG. 1, the proposed system comprises a column support (10), the transverse configuration of which is substantially U-shaped and the arms of which exhibit a concavity which ends in extension portions or arms (10c), by means of which said support is fixed to the structural elements of the motor vehicle bodywork, not shown in the Figures.

Inside said support (10) and in contact therewith, there is located the intermediate component (20), which also has a U shaped cross section and whose arms exhibit bends which reduce the width of the cross section, extending longitudinally and in parallel manner, gripping between them the outer column tube (21), inside which is located the column shaft (14) proper.

Between the arms of the intermediate component (20) there is located the lower mobile component (22), also of U-shaped cross section, the arms of which are bent so as to converge inwards and are welded to the outer column tube (21).

With reference to the accompanying Figures, in the center of the assembly there are located the telescopic shafts, that is to say the shaft (14) and the outer column tube (21), where appropriate the members (23), exhibiting relative displacement under load, forming part of the core of longitudinal movement to be observed in the steering column in question.

Figure 2:
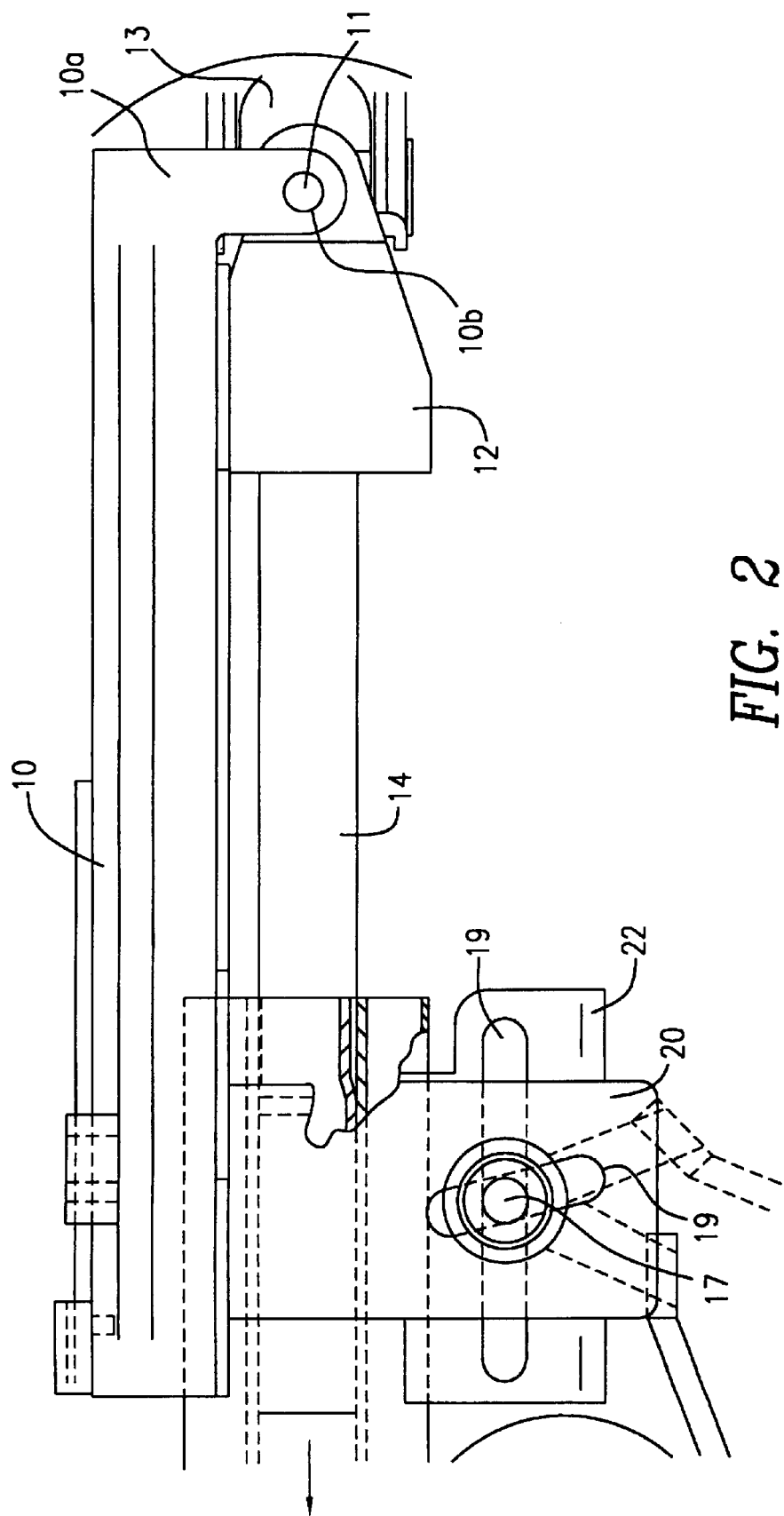
FIG. 2 is a corresponding side view also of the same steering column, included to clarify to a greater degree the relative positions of the components in the previous Figure.

In the lower part, see FIGS. 1 and 2, there is located the basic mechanism of the system for adjusting the movement of the column, this adjusting mechanism not being essential for controlling longitudinal displacement guidance illustrated in this example, since the case may arise of a simple assembly sliding under a certain load which needs to be guided in its relative displacement and to which the present invention would be applicable, but nonetheless said adjusting mechanism is shown by way of example in its role of permitting the column (14) to move vertically as well as longitudinally, maintain the reliability of the guidance control system illustrated.

Displacement of the column (14) is obtained owning to the pin (17) which passes perpendicularly through the arms of the intermediate component (20) as well as the lower mobile component (22), said pin, as may be seen from FIG. 1, having at one of its ends a conventional head (18), while at the opposite part it is appropriately threaded, for adjustment of the corresponding nut (15) and a protective stopper therefor (16).

Adjustment of the system is ensured by the provision in the lower mobile component (22) and the intermediate component (20) of the slot (19), in which the above-described pin may move.

In the upper part of the assembly, as may be seen in FIG. 2, there is provided the stationary structure of the steering column or the column support (10), which is fixed to the structure of the vehicle by means of the extension portions (10c); in the end part of said support (10) there is located the lug (10a), which at its end part has a hole (10b) for passage of the pin (11), on which is articulated the pivoting bearing (12), in which is held the shaft of the steering column (14), in such a way that said shaft may pivot via the bearing and the pin (11) with respect to the column support (10).

At the end part of the column shaft (14) there is located the corresponding universal joint (13), which allows the articulation of (14) with other members of the steering system which allow its introduction into the steering box proper or which allow changes of direction thereof if so required by the structure of the vehicle and its characteristics.

A similarly fundamental active part, also during the process of guiding the entire mobile assembly, proves to be the sliding intermediate component (20), which remains in direct contact with the stationary structure along the entire extent thereof and which could be said to be continuously guided thereby.

Finally, and as may be seen from FIGS. 1 and 2, there is the lower mobile component (22), displaceable in the longitudinal and vertical directions and actuated directly by the adjusting mechanism, said lower component (22) allowing the column (14) to fulfil the functions of height and depth adjustment, whenever voluntarily required.

It may be noted that, in this case, the above-mentioned intermediate component in some way involves the guidance system of the lower mobile component (22), during its displacement in the vertical direction, as well as constituting the limit of the travel or path of said latter component, as may be noted from an analysis of the two Figures.

Figure 3:
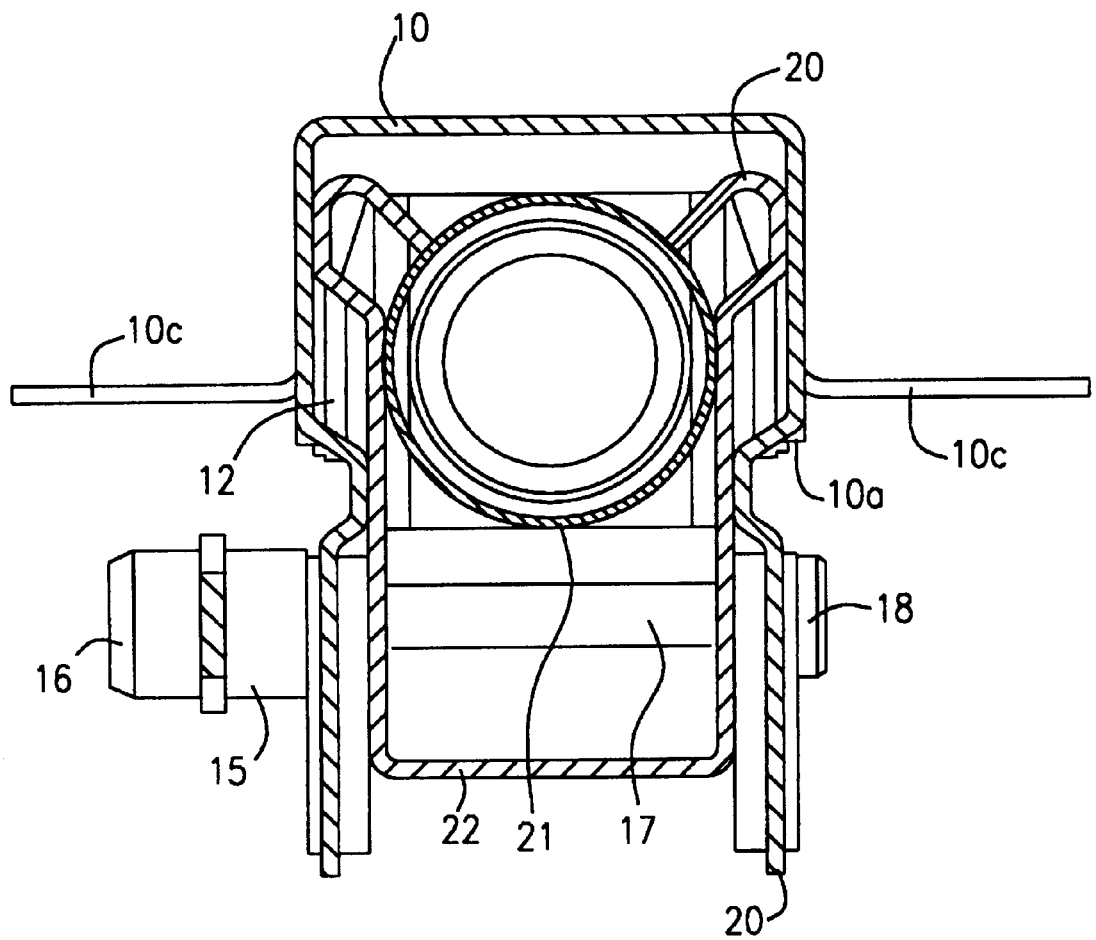
FIG. 3 shows an alternative to FIG. 1, which, on the basis of the same system, reveals the advantages of the invention described above, as well as demonstrating the scope and range of the invention idea and its possible applications.

On the other hand, FIG. 3 shows an embodiment equivalent to that described above, comprising a steering column shaft adjustable vertically but not longitudinally but also exhibiting guidance control in the longitudinal direction provided so that, upon the application of a defined collapsing load, the assembly of mobile components moves in said direction in an appropriate manner and without obstacles or deviations in its path.

Said FIG. 3 also shows, in addition to the height adjustment mechanism similar to that shown in FIG. 1, a new stationary component or structure (10) different form that shown in FIGS. 1 and 2, which acts both as a directional guide and limit stop for the vertical travel of the vertically displaceable component (20), by means of the adjustment mechanism. As in the previous example, guidance control is possible via the direct contact of the components exhibiting relative movement, owing to their form, which is suited to allowing the displacement to be effected correctly.

It may also be understood that, maintaining the section shown in FIG. 3, along the path required for displacement during collapse, the contact between the above-mentioned components (20) and (23) permits optimum travel of said collapse in the longitudinal direction.

The subject matter of the present Patent has been adequately described, in relation to the attached drawings, and it will be understood that any modifications in detail may be made to the same which are considered advantageous as long as the proposed variations do not alter the essence of the patent summarized in the following claims.

What is claimed is:

1. Longitudinal guidance control system for telescopic shafts or assemblies with collapsing mechanisms in motor vehicle steering columns comprising a male member or column shaft (14) inserted inside a female member and permitting both adaptation of the working length of a steering system and collapse thereof as part of an impact system, characterized in that said system comprises a column support (10) formed of a component with a substantially U-shaped cross section, the arms of which are bent to form a concave surface which is extended by extension portions (10c) which allow connection of the support (10) to a vehicle, the system being articulated by means of lugs (10a) located at the end of the support (10) and which articulate a steering column shaft (14) by means of a pivoting bearing (12), the lower end of which is passed through by a hole (10b) and a pin (11), which allow movement of said column shaft (14) relative to said support (10), the column shaft (14) being surrounded by an outer column tube (21) which is imprisoned by an intermediate component (20) of U-shaped cross section, the arms of which bend inwards and the base of which is located permanently in contact with said column support (10), the arms of which is located permanently in contact with said column support (10), the arms of said component having the corresponding hole (10b) passing therethrough, a lower mobile component (22) being located therebetween and having an U-shaped cross section, the arms of which converging inwards and being connected to the outer column tube (21), and a pin (17) passing thought the arms of the intermediate component (20) and the lower mobile component (22).

2. The system according to claim 1, characterized in that said pin (17) is provided at one of its ends with a head (18) while at the opposite end it is provided with a threaded surface which is encircled by a nut (15) which is covered by a stopper (16), said pin (17) being suitable to be fixed at any point of the slot (19).

3. The system according to claim 1, characterised in that said system consists of a column support (10) of U-shaped cross section, the arms of which have concave deformations in its central zone, exhibiting contact on the inside with a lower mobile component (22) of U-shaped cross section, the arms of which bend inwards in the vicinity of their ends, being in partial contact with the column support (10), the arms of said intermediate component (20) and said lower mobile component (22) having a pin (17) passing therethrough.

* * * * *